May 20, 1958  W. JAVES  2,835,274
VALVE MECHANISM FOR CONTROLLING THE
FLOW OF LIQUIDS
Filed March 9, 1956
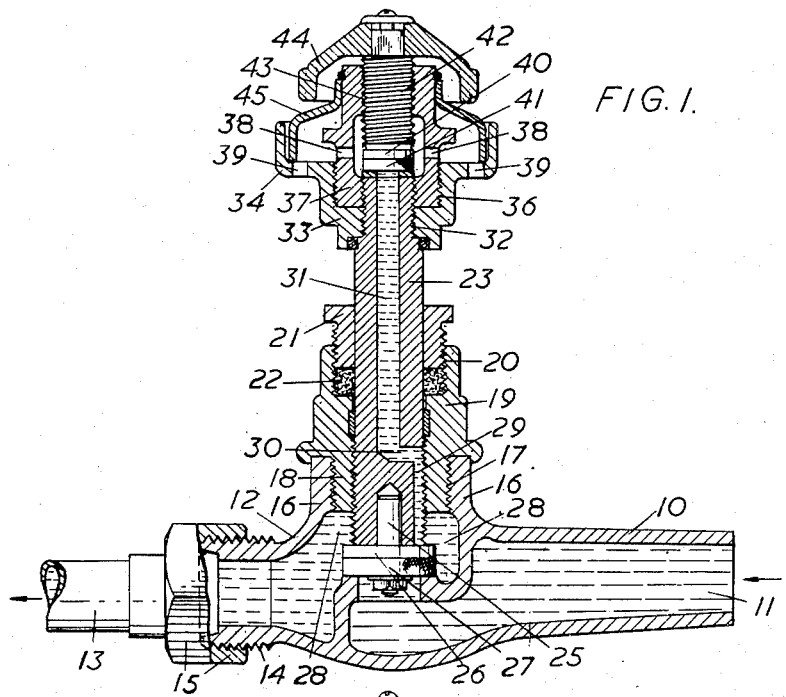
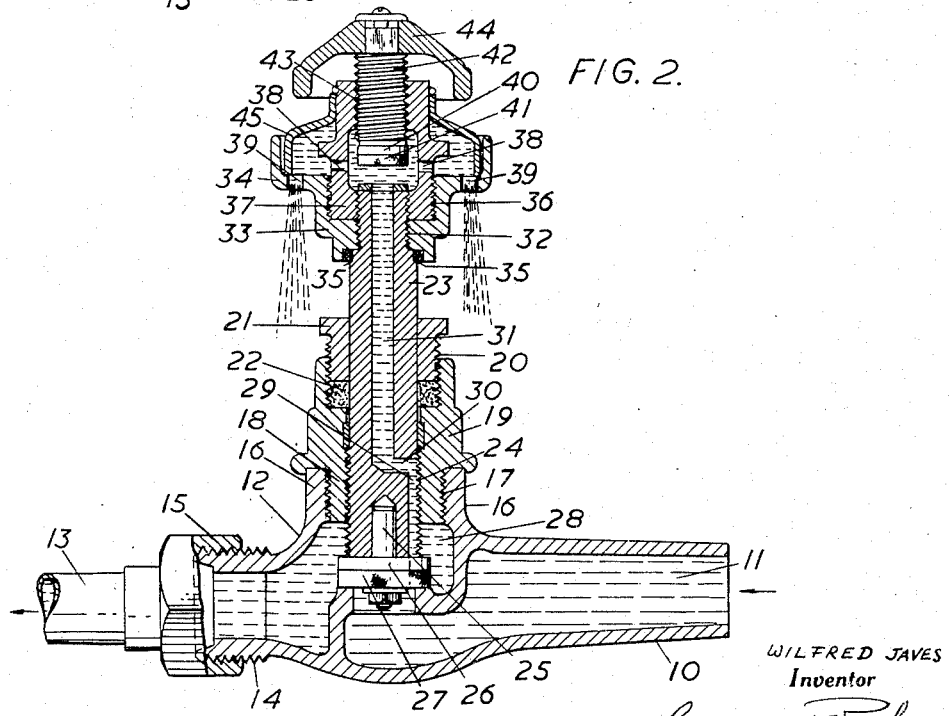
WILFRED JAVES
Inventor
By
Attorney

2,835,274
VALVE MECHANISM FOR CONTROLLING THE FLOW OF LIQUIDS

Wilfred Javes, Derby, England

Application March 9, 1956, Serial No. 570,503

1 Claim. (Cl. 137—637.2)

This invention relates to valve mechanism for controlling the water supply system in a building so that the mains supply can be shut off when required and also the water already in the system can be drained off through a bleeder valve.

The object of this invention is to provide an improved arrangement of bleeder valve by which the valve face can be easily renewed from time to time without skilled attention and at very small cost.

Referring to the drawings which form a part of this specification:

Figure 1 is a sectional elevation of a mechanism incorporating a main valve and an auxiliary bleeder valve both of which are shown in the closed position.

Figure 2 is a similar view to Figure 1 showing the bleeder valve open.

The mechanism comprises a valve body in the form of a T-junction. One arm 10 is open to the mains supply under pressure as indicated at 11. The opposite arm 12 communicates with the flow pipe 13 through which the system is supplied. As shown the arm 12 is provided with screw-threads 14 and the flow-pipe is connected to it by means of a union fitting 15. The third arm 16 of the valve body is internally screw-threaded at 17 to receive the correspondingly screw-threaded inner end 18 of the main gland body 19 of the valve assembly. The gland body 19 is also screw-threaded internally at 20 at its outer end to receive a gland nut 21 which is screwed in to compress a packing or seal 22. The main control spindle 23 passes through the gland body 19, gland nut 21 and packing 22 and the inner ends of the gland body 19 and control spindle 23 have co-operating screw-threads 24 by which the control spindle can be screwed in or unscrewed to close or open the main shut-off valve. This comprises a stem 25 which fits into a recess in the inner end of the spindle 23, a disc 26 and a packing or washer 27 attached to the disc 26. This main control valve 25, 26, 27 is shown in its closed position shutting off the mains pressure in the same way as with a stop tap of normal pattern. The flow pipe 13 and the system which is fed by it are open to the external face of the control spindle in the valve body at 28 and the spindle is formed with axial grooves one of which is shown at 29 leading along it to radial holes 30 (one only again being seen in the drawings). These radial holes 30 in turn communicate with a passage 31 leading axially through the spindle to the outer end thereof. The outer end of the spindle has screw-threads 32 externally to receive the internally-threaded boss 33 of an operating wheel 34, the boss being tightened up against a shoulder 35 on the spindle. The outer end of the boss 33 is screw-threaded at 36 to receive a hollow plug 37 which is also screw-threaded to fit on to the outer end of the spindle 23. The passage 31 opens into this hollow plug 37 which is provided with holes 38 through which liquid passing along the passage 31 can escape, and drain away through further holes 39 in the operating wheel 34 as shown in Figure 2. The outer end of the passage 31 however is controlled by a valve member 40 having a washer 41 and carried by a short spindle 42 which is externally screw-threaded at 43 and is screwed through corresponding screw-threads in the hollow plug 37. The short spindle 42 is fitted with a second operating wheel 44 on its outer end. Both operating wheels 34, 44 are suitably locked to their respective spindles 23, 42. The plug 37 carries a deflector plate 45 which serves to deflect the issuing liquid through the holes 39. If preferred however the parts could be designed so as to receive a hose pipe to carry away the discharge instead of letting it run out through the holes 39 as shown.

In the normal position the main valve 25, 26, 27 is open to allow the mains pressure to pass through the valve body to the flow pipe. In operating my invention the main operating wheel 34 is turned, forcing the control spindle 23 to tighten the main valve washer 27 on to its seating as shown in Figure 1, so that the mains pressure is shut off. Then the second operating wheel is turned in the opposite direction to open the bleeder valve 40, 41, as shown in Figure 2. The liquid in the system can now leak along the control spindle 23 by way of the passage 31 and drain away through holes 38, 39.

An added refinement is the provision of means for preventing leakage along the control spindle until the main valve has been closed, for example providing a collar at the inner part of the control spindle with a co-operating sealing washer, so arranged that when the control spindle is unscrewed the sealing washer makes contact with the gland body and blanks off the grooves and holes in the control spindle to the passage 31 and the bleeder valve 40, 41.

It will be seen that the invention does not involve any alterations in the supply system itself. In the ordinary household water system all that would be required would be to remove the complete gland unit of the existing stop tap from the arm 16 of the body and fit the valve unit of the present invention in its place, which can be done in a few minutes.

Although the invention is mainly intended for use in connection with water supply systems with the object of providing a ready means whereby household or other pipes can be drained of water to prevent frost damage, it is possible that the mechanism may be of value in other conditions.

I claim:

A valve mechanism comprising a valve body, fluid inlet and outlet passageways in the valve body, a co-operating control valve and control valve seat in the body, a spindle associated with the control valve, a passage through the spindle, a fluid inlet to and fluid outlet from the spindle, screw-threads on the spindle and structure cooperating with the screw-threads to effect axial movement of the control valve, a bleeder valve controlling the outlet from the spindle, a washer carried by the bleeder valve, a seat for the bleeder valve washer surrounding the outlet from the spindle, a second spindle operatively associated with the bleeder valve, screw-threads on the second spindle and structure co-operating with these screw-threads to effect axial movement of the bleeder valve, thereby to press the washer on to its seat, two operating wheels, one attached to each spindle for opening and closing the control valve and the bleeder valve respectively, a boss on the operating wheel attached to the first spindle, a hollow plug fitted on to the end of the first spindle and engaging in the boss, cooperating screw-threads on the boss, the plug and the spindle, the plug having holes in it through which water passing through the spindle can escape, the plug having further screw-threads and the second spindle being screwed into the plug, a deflector carried by the plug, the deflector being positioned so that water emerging through the holes in the plug will impinge on the deflector, the operating wheel for the first spindle having holes in it through which such water after impinging on the deflector can run out.

References Cited in the file of this patent

UNITED STATES PATENTS

| | | |
|---|---|---|
| 26,785 | Robertson | Jan. 10, 1860 |
| 1,099,418 | Aughenbaugh | June 9, 1914 |
| 1,228,060 | Schulder | May 29, 1917 |
| 1,236,372 | Hitchcock | Aug. 7, 1917 |
| 1,381,766 | Tonkin et al. | June 14, 1921 |
| 1,617,333 | Hutchings | Feb. 15, 1927 |
| 2,116,626 | Guildford | May 10, 1938 |